United States Patent
Jordan

(10) Patent No.: US 8,552,878 B2
(45) Date of Patent: Oct. 8, 2013

(54) VOLTAGE DROP CANCELLATION

(75) Inventor: James D. Jordan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 12/754,434

(22) Filed: Apr. 5, 2010

(65) Prior Publication Data

US 2011/0241893 A1 Oct. 6, 2011

(51) Int. Cl.
- *G08B 21/00* (2006.01)
- *G08B 9/00* (2006.01)
- *H02J 7/00* (2006.01)
- *H02J 9/00* (2006.01)

(52) U.S. Cl.
USPC ........... 340/663; 340/333; 340/693.2; 307/66

(58) Field of Classification Search
USPC ................................. 340/333, 693.2; 307/66
See application file for complete search history.

(56) References Cited

U.S. PATENT DOCUMENTS

| | | | |
|---|---|---|---|
| 5,672,952 A | 9/1997 | Szepesi | |
| 6,034,508 A | 3/2000 | Chang | |
| 6,160,374 A | 12/2000 | Hayes et al. | |
| 6,160,389 A | 12/2000 | Watts | |
| 6,642,632 B2 * | 11/2003 | Lucas et al. | 307/64 |
| 7,327,119 B2 | 2/2008 | Stephenson, III | |
| 7,391,184 B2 | 6/2008 | Luo et al. | |
| 7,471,061 B2 | 12/2008 | Shah et al. | |
| 2007/0210755 A1 | 9/2007 | Gangstoe et al. | |
| 2008/0030078 A1 * | 2/2008 | Whitted et al. | 307/66 |
| 2008/0278978 A1 | 11/2008 | Czimmek | |
| 2009/0015211 A1 | 1/2009 | Ribellino et al. | |

FOREIGN PATENT DOCUMENTS

| WO | 9320610 | 10/1993 |
|---|---|---|
| WO | 2008016571 A1 | 2/2008 |

OTHER PUBLICATIONS npn-Transistor Operation. Radartutorial.eu. "http://www.radartutorial.eu/21.semiconductors/hl19.en.html". Accessed Feb. 5, 2013.*
David Johnson, P.E., Ideal Blocking Diode Circuit for Photovoltaic Solar Panels, http://www.discovercircuits.com/DJ-Circuits/PVIdealDiode.htm, Retrieved Mar. 2, 2010.
On Semiconductor, Small Signal MOSFET, 30 V, 270 mA, Single N-Channel, SC-70, NTS4001N, http://onsemi.com, Sep. 2006.

* cited by examiner

*Primary Examiner* — Daniel Wu
*Assistant Examiner* — John Bamert
(74) *Attorney, Agent, or Firm* — Kunzler Law Group

(57) ABSTRACT

An apparatus, system, and method are disclosed for bypassing a voltage drop. A protection module allows electric current to flow from an electric power storage device to a load. The protection module prevents electric current from flowing to the electric power storage device. The protection module includes a voltage drop between the electric power storage device and the load. A power source detection module detects an absence of electric power from an electric power source. The electric power source provides electric current to the load when electric power from the electric power source is present. A bypass module bypasses the protection module and the voltage drop in response to the power source detection module detecting the absence of electric power from the electric power source. A conservation module delivers, to the load, electric current flowing through the power source detection module.

17 Claims, 5 Drawing Sheets

VOLTAGE DROP CANCELLATION

FIELD

The subject matter disclosed herein relates to electric power storage devices and more particularly relates to protection circuits for electric power storage devices.

BACKGROUND

Description of the Related Art

Electric power storage devices, such as batteries, are used to power many devices. Batteries are used in most portable electronic devices as a primary source of power. In many other electronic devices, batteries provide a backup source of power. For example, electronic devices that keep time using a real-time clock circuit often have a battery to power the circuit in case of a power outage or if the device is disconnected from a different power source so that the time remains accurate.

One such type of device is a computer, such as a blade server, laptop, desktop, or the like. Computers usually include a coin cell battery that allows the computer to keep time, even when the computer is not plugged in or experiences a power outage. The coin cell battery in a computer is usually not rechargeable and can also be difficult to replace.

Some electronic devices rely on battery power for extended periods of time. Devices may be manufactured and then placed into storage for an extended period of time, or undergo an extended period of disuse. It is beneficial for the battery to provide power to the device for the entire extended period. For example, a computer may rely on a coin cell battery to power a real-time clock circuit for an extended period of time between the time when the computer is manufactured and the time when the computer is sold.

To extend the usable life of an electronic device that uses battery power, some electronic devices simply use batteries with greater power storage capacities. However, the size of a battery usually increases as the power storage capacity increases. For electronic devices or circuits with size constraints, a larger battery may not be an option.

BRIEF SUMMARY

From the foregoing discussion, it should be apparent that a need exists for an apparatus, system, and method that extend the usable life of an electric power storage device. Beneficially, such an apparatus, system, and method would extend the usable life of the electric power storage device by bypassing a voltage drop in a protection circuit for the electric power storage device.

The present invention has been developed in response to the present state of the art, and in particular, in response to the problems and needs in the art that have not yet been fully solved by currently available protection circuits. Accordingly, the present invention has been developed to provide an apparatus, system, and method for bypassing a voltage drop in a protection circuit that overcome many or all of the above-discussed shortcomings in the art.

The apparatus to bypass a voltage drop is provided with a plurality of modules configured to functionally execute the necessary steps of bypassing the voltage drop. These modules in the described embodiments include a protection module, a power source detection module, a bypass module, and a conservation module.

The protection module, in one embodiment, allows electric current to flow from an electric power storage device to a load. In a further embodiment, the protection module prevents electric current from flowing to the electric power storage device. The protection module, in another embodiment, includes a voltage drop between the electric power storage device and the load.

In one embodiment, the power source detection module detects an absence of electric power from an electric power source. The electric power source, in one embodiment, provides electric current to the load when electric power from the electric power source is present.

The bypass module, in one embodiment, bypasses the protection module in response to the power source detection module detecting the absence of electric power from the electric power source. In a further embodiment, the bypass module bypasses the protection module such that the electric current from the electric power storage device reaches the load without the voltage drop of the protection module. In one embodiment the conservation module delivers, to the load, electric current flowing through the power source detection module.

A method of the present invention is also presented to bypass a voltage drop. The method in the disclosed embodiments substantially includes the steps necessary to carry out the functions presented above with respect to the operation of the described apparatus. In one embodiment, the method includes allowing electric current to flow from an electric power storage device to a load. In a further embodiment, the method includes preventing electric current from flowing to the electric power storage device. The electric current, in one embodiment, has a voltage drop between the electric power storage device and the load.

In another embodiment, the method includes detecting an absence of electric power from an electric power source. The electric power source, in one embodiment, provides electric current to the load when electric power from the electric power source is present. In a further embodiment, the method includes bypassing the voltage drop in response to detecting the absence of electric power from the electric power source so that the electric current from the electric power storage device reaches the load without the voltage drop. In one embodiment, the method includes delivering, to the load, electric current used to detect an absence of electric power from the electric power source.

Another apparatus to bypass a voltage drop is provided with a plurality of modules configured to functionally execute the necessary steps of bypassing the voltage drop. These modules in the described embodiments include a protection module, a power source detection module, and a switch.

In one embodiment, the protection module performs a diode function. An anode of the protection module, in a further embodiment, is electrically coupled to an electric power storage device and a cathode of the protection module is electrically coupled to a load. The protection module, in one embodiment, allows electric current to flow from the electric power storage device to the load and prevents electric current from flowing to the electric power storage device. In another embodiment, the protection module includes a voltage drop between the electric power storage device and the load.

In one embodiment, the power source detection module detects an absence of electric power from an electric power source. The electric power source, in one embodiment, provides electric current to the load at the cathode of the protection module when electric power from the electric power source is present.

The switch, in one embodiment, is electrically coupled to the anode and the cathode of the protection module so that the switch and the protection module are disposed in a parallel configuration. In a further embodiment, the switch closes in response to the power source detection module detecting the absence of electric power from the electric power source. In another embodiment, the switch closes so that electric current from the electric power storage device reaches the load without the voltage drop of the protection module. In one embodiment, electric current flowing through the power source detection module is delivered to the load.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
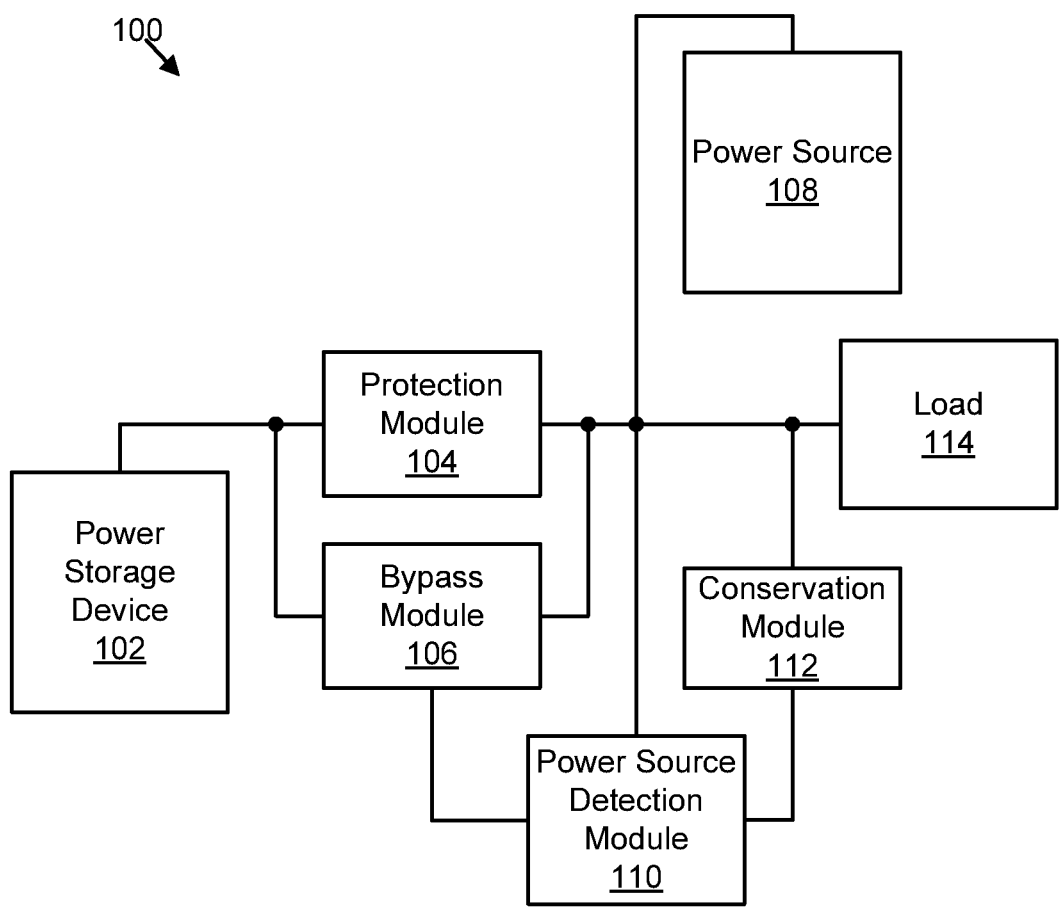
FIG. 1 is a schematic block diagram illustrating one embodiment of a system to bypass a voltage drop in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable program code embodied on a computer readable medium may be transmitted using any appropriate medium, including but not limited to wireless, wireline, optical fiber cable, RF, etc., or any suitable combination of the foregoing.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments of the invention may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 to bypass a voltage drop. In the depicted embodiment, the system 100 includes an electric power storage device 102, a protection module 104, a bypass module 106, an electric power source 108, a power source detection module 110, a conservation module 112, and a load 114. In one embodiment, the system 100 delivers electric current from the electric power source 108 to the load 114 when electric power from the electric power source 108 is present and delivers electric current from the electric power storage device 102 to the load 114 when electric power from the electric power source 108 is absent. For example, in one embodiment, the system 100 may provide electric current to power a load 114 so that the load 114 remains powered even when the electric power source 108 is not connected to the system 100 or the electric power source 108 undergoes a failure or other power outage.

In one embodiment, the electric power storage device 102 provides electric current for the load 114. The electric current from the electric power storage device 102, in one embodiment, is direct current ("DC"). The electric power storage device 102, in one embodiment, may include a battery with one or more electrochemical cells. In a further embodiment, the electric power storage device 102 includes a coin cell battery. The electric power storage device 102, in another embodiment, may include a capacitor, a fuel cell, and/or another type of electric power storage device.

An output voltage of the electric power storage device 102, in one embodiment, decays over time as the charge of the electric power storage device 102 becomes depleted. In one embodiment, the electric power storage device 102 is not rechargeable and exposure to a charging current may cause corrosion, leakage, explosion, and/or other safety concerns. The electric power storage device 102, in one embodiment, is used in an area with limited space that may prohibit the use of a larger electric power storage device that may have a higher power storage capacity.

In one embodiment, the protection module 104 protects the electric power storage device 102 from reverse current. The protection module 104, in one embodiment, allows electric current to flow from the electric power storage device 102 to the load 114 and prevents electric current from flowing to the electric power storage device 102, performing a diode function. The protection module 104, in a further embodiment, includes a blocking diode. In one embodiment, the protection module 104 has a cathode and an anode. The anode of the protection module 104, in one embodiment, may be electrically coupled to the electric power storage device 102. The cathode of the protection module 104, in one embodiment, may be either directly or indirectly electrically coupled to the load 114.

In another embodiment, the protection module 104 may include a switch type device that selectively interrupts an electrical path to the electric power storage device 102 to prevent electric current from flowing to the electric power storage device 102. In a further embodiment, the protection module 104 may include a switch type device and may be integrated with and/or part of the bypass module 106 described below. For example, in various embodiments, the protection module 104 may include a diode, a transistor, a switch, a relay, a resistor, and/or another device capable of protecting the electric power storage device 102 from reverse current. One of skill in the art, in light of this disclosure, will recognize other examples of devices that the protection module 104 may include.

The protection module 104, in one embodiment, includes a voltage drop. The voltage drop, in one embodiment, causes electric current that passes through the protection module 104 to have a lower voltage at the output of the protection module 104 than at the input. In one embodiment, the voltage drop of the protection module 104 may lower the voltage of the electric current below a usable voltage level for the load 114 if left in the path of the electric current from the electric power storage device 102 as the output voltage of the electric power storage device 102 decays. Because of the voltage drop of the protection module 104, in one embodiment, the voltage of electric current delivered to the load 114 may be below a usable level for the load 114, even if the output voltage of the electric power storage device 102 is above the usable level.

In a further embodiment, the voltage drop of the protection module 104 may be beneficial when it does not lower the voltage of the electric current below a usable voltage level for the load 114. For example, in various embodiments, the voltage drop of the protection module 104, by lowering the voltage to a level that is still usable by the load 114, may increase electrical efficiency of the load 114, decrease operating temperatures, decrease leakage currents in the load 114, and the like. For example, the load 114 may include a device that has a limited input voltage range and the voltage drop may lower the voltage of the electric power storage device 102 to fit in the allowable voltage range of the device. In such embodiments, the voltage drop of the protection module 104 may extend the usable life of the electric power storage device 102 while the voltage is still at a usable level by increasing efficiency of the load 114, decreasing leakage currents in the load 114, and the like.

In one embodiment, the bypass module 106 bypasses the protection module 104. By bypassing the protection module 104, in one embodiment, the bypass module 106 allows electric current from the electric power storage device 102 to reach the load 114 without the voltage drop of the protection module 104. The bypass module 106, in one embodiment, bypasses the protection module 104 in response to the power source detection module 110 detecting an absence of electric power from the electric power source 108, so that the bypass module 106 does not bypass the protection module 104 while electric power from the electric power source 108 is present. In a further embodiment, the bypass module 106 bypasses the protection module 104 in response to the power source detection module 110 detecting an absence of electric power from the electric power source 108 and in response to an output voltage of the electric power storage device 102 falling below a predefined level.

As is described below with regard to the power source detection module 110, the power source detection module 110 may detect an absence of electric power from the electric power source 108 by detecting a voltage and/or a current from the electric power source 108. In various embodiments, the power source detection module 110 detects an absence of power from the power source 108 by detecting power going to the load 114, by detecting an absence of voltage from the power source 108 or a voltage lower than a threshold, by detecting current from the power source, or by other means known to those in the art in view of this disclosure.

By bypassing the voltage drop of the protection module 104, in one embodiment, the bypass module 106 raises the voltage of the electric current that the system 100 delivers to the load 114 (or to a voltage regulator of the like that may be coupled to the load 114) by about the amount of the voltage drop. In a further embodiment, bypassing the voltage drop raises the voltage and/or electric current that the system 100 delivers to the load 114 above a minimum threshold. The minimum threshold, in one embodiment, may be a level where one or more components of the load 114 function properly. For example, a higher system voltage may allow one or more components of the load 114 to operate and use current from the power storage device 102. By bypassing the voltage drop of the protection module 104, in another embodiment, the bypass module 106 increases a usable life of the electric power storage device 102 when compared to a usable life of the electric power storage device 102 with the presence of the voltage drop of the protection module 104.

While the bypass module 106 bypasses the voltage drop of the protection module 104, in one embodiment, the bypass module 106 also includes a voltage drop that is smaller than the voltage drop of the protection module 104. For example, the bypass module 106 may have a voltage drop due to path resistances or the like. In one embodiment, a voltage drop of the bypass module 106 is minimal in comparison to the voltage drop of the protection module 104.

The bypass module 106, in one embodiment, performs a switching function and includes a switch, such as a transistor, a relay, a mechanical switch, or another type of switch. In one embodiment the bypass module 106 bypasses the protection module 104 by closing a switch. In a further embodiment, the bypass module 106 has a switching time that is faster than a time it takes for damage to occur to the electric power storage device 102 due to electric current from the electric power source 108. In one embodiment, the bypass module 106 is electrically coupled to the protection module 104 in parallel. For example, in one embodiment, the bypass module 106 may be electrically coupled to an anode of the protection module 104 and to a cathode of the protection module 104 to short circuit the protection module 104 when a switch of the bypass module 106 is closed. One of skill in the art, in light of this disclosure, will recognize other examples of devices that the bypass module 106 may include.

In one embodiment, the electric power source 108 provides electric power to the load 114. In a further embodiment, the electric power source 108 provides electric current to the load 114 when electric power from the electric power source 108 is present. For example, in various embodiments, the electric power source 108 may provide electric current to the load 114 when the system 100 is connected to an external power source, but may not provide electric current to the load 114 when the system 100 is not connected to an external power source and/or when the electric power source 108 or an external power source experiences a failure, a power outage, or the like.

In one embodiment, the electric power source 108 includes a power supply unit ("PSU"). A PSU of the electric power source 108, in one embodiment, converts alternating current ("AC") electric power to DC electric power. The electric power source 108, in a further embodiment, includes a PSU for a computing device, such as a blade server, a desktop computer, a portable computing device, or the like. In one embodiment, the system 100 undergoes a period of time during which electric power from the electric power source 108 is absent and the electric power storage device 102 provides electric current to the load 114. For example, in one embodiment, the system 100 may undergo a period of storage, portable use, or the like when electric power from the electric power source 108 is absent.

In one embodiment, the power source detection module 110 detects an absence of electric power from the electric power source 108. The power source detection module 110, in a further embodiment, may detect the absence of electric power by detecting that a voltage and/or current has fallen below a threshold value, by detecting that an electrical connection is not present, or the like. In various embodiments, the power source detection module 110 detects an absence of power from the power source 108 by detecting power going to the load 114, by detecting an absence of voltage from the power source 108 or a voltage lower than a threshold, by detecting current from the power source, or by other means known to those in the art in view of this disclosure.

In one embodiment, the power source detection module 110 includes a driving circuit that causes the bypass module 106 to bypass the protection module 104 in response to detecting an absence of electric power from the electric power source 108. In a further embodiment, a driving circuit of the power source detection module 110 may cause the bypass module 106 to stop bypassing the protection module 104 in response to detecting a presence of electric power from the electric power source 108.

In one embodiment, the power source detection module 110 may detect an absence of electric power from the electric power source 108 by delivering electric current from the electric power source 108 to a driving circuit that causes the bypass module 106 to stop bypassing the protection module 104 in response to electric power from the electric power source 108. In a further embodiment, an absence of electric power from the electric power source 108 causes the bypass module 106 to bypass the protection module 104 because the power source detection module 110 does not deliver electric current from the electric power source 108 to the driving circuit. In another embodiment, the power source detection module 110 detects an absence of electric power from the electric power source 108 by detecting a differential voltage between the electric power storage device 102 and the load 114 that is below a predefined threshold.

In a further embodiment, the power source detection module 110 may include one or more switches that close in response to electric power from the electric power source 108 and open in response to an absence of electric power from the electric power source 108, such as one or more N type field-effect transistors or the like. The bypass module 106, in one embodiment, may include a switch, such as a P type field-effect transistor or the like, that opens in response to a switch from the power source detection module 110 closing and closes in response to the switch opening. In a further embodiment, the bypass module 106 and the power source detection module 110 may be integrated. For example, in one embodiment the bypass module 106 and the power source detection module 110 may be integrated as a switch, such as a P type field-effect transistor or the like, that opens in response to a presence of electric power from the electric power source 108 and closes in response to an absence of electric power from the electric power source 108. In other embodiments, one or more other types of switches, such as PNP and/or NPN bipolar junction transistors ("BJT's"), relays, and/or other switch type devices may be used in place of the example N type and P type field-effect transistors discussed in these example embodiments.

In a further embodiment, the power source detection module 110 includes one or more current and/or voltage sensors that detect an absence of electric power from the electric power source 108. Because electric power includes a voltage and a current, the power source detection module 110, in one embodiment, may detect an absence of electric power by detecting that a voltage, a current, or both from the electric power source 108 have fallen below a predefined threshold level. For example, in various embodiments, the power source detection module 110 may include one or more Hall effect current sensors, current transformers, current sense resistors, and/or other current or voltage sensors.

In another embodiment, the power source detection module 110 includes a diode or other diode type device to prevent electric current from the electric power storage device 102 from flowing through the power source detection module 110 to the electric power source 108. In a further embodiment, an anode of the diode of the power source detection module 110 is electrically coupled to the electric power source 108 and a cathode of the diode is electrically coupled to the driving circuit to deliver electric current from the electric power source 108 to the driving circuit when electric power from the electric power source 108 is present.

In one embodiment, the conservation module 112 delivers electric current that flows through the power source detection module 110 to the load 114. In a further embodiment, the electric current that flows through the power source detection module 110 is leakage current that would otherwise be wasted, that may decrease the efficiency of the system 100 and the life of the electric power storage device 102. In another embodiment, the conservation module 112 delivers the electric current to the load 114 at an output of a voltage regulator that maintains an output voltage at a substantially constant level. In one embodiment, an amount of electric current that the conservation module 112 delivers to the load 114 is low enough that the voltage regulator can maintain the output voltage at a substantially constant level or above a minimum threshold. For example, in one embodiment, the amount of electric current that the conservation module 112 delivers to the load 114 may be less than an amount of electric current from the voltage regulator. The voltage regulator is discussed in greater detail with regard to FIG. 2.

In a further embodiment, by delivering electric current that flows through the power source detection module 110 to an output of the system 100, the conservation module 112 allows the power source detection module 110 to use a voltage at the output as a reference voltage instead of using ground or another system voltage. In one embodiment, the power source detection module 110 uses the output voltage as a reference voltage and does not include a path to ground. In another embodiment, the power source detection module 110 offers little or no alternate routes for electric current but through the conservation module 112.

In one embodiment, the load 114 includes an electrical device that receives electric current from the electric power storage device 102 and/or the electric power source 108. The load 114, in a further embodiment, uses the electric current to provide a function, maintain a state, or the like. For example, in one embodiment, the load 114 may include a real-time clock that keeps time using electric current from the electric power storage device 102 when electric power from the electric power source 108 is not available. In a further embodiment, for example, the load 114 may include a volatile memory device that maintains data in memory using electric current from the electric power storage device 102 when electric power from the electric power source 108 is absent.

In one embodiment, the load 114 includes one or more components of a computing device. For example, in various embodiments, the load 114 may include one or more components of a blade server, a desktop computer, a portable computing device, or the like. In one embodiment, the load 114 includes several components, such as an oscillator and a real-time clock, or another group of related components. In a further embodiment, the electric power storage device 102 includes a coin cell battery and the load 114 includes a real-time clock, an oscillator, a volatile memory device, and/or other components of a computing device.

Figure 2:
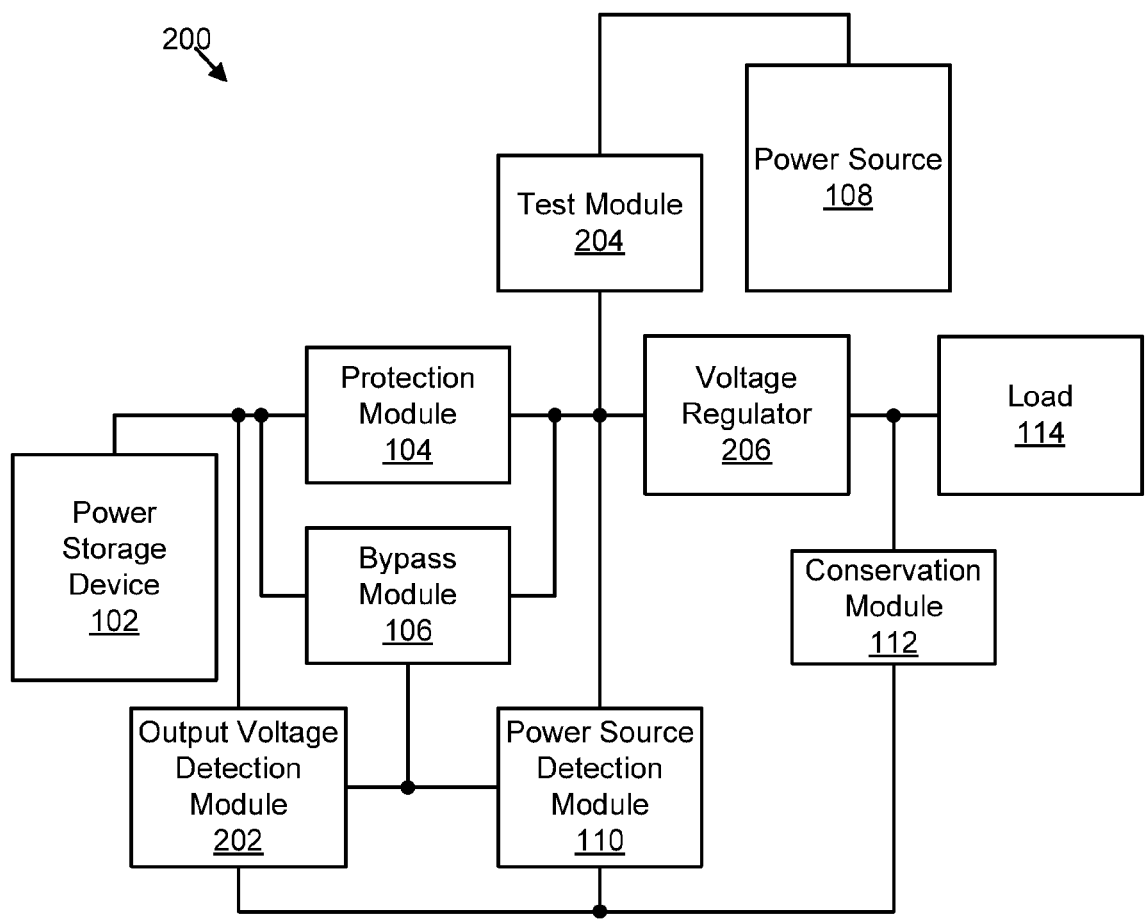
FIG. 2 is a schematic block diagram illustrating another embodiment of a system to bypass a voltage drop in accordance with the present invention.

FIG. 2 depicts one embodiment of a system 200 to bypass a voltage drop. Like the system 100 of FIG. 1, the system 200, in the depicted embodiment, includes the electric power storage device 102, the protection module 104, the bypass module 106, the electric power source 108, the power source detection module 110, the conservation module 112, and the load 114. In the depicted embodiment, the system 200 further includes an output voltage detection module 202, a test module 204, and a voltage regulator 206. The system 200, in the depicted embodiment, bypasses the voltage drop of the protection module 104 in response to an absence of electric power from the electric power source 108 and an output voltage of the electric power storage device 102 falling below a predefined level.

In one embodiment, the output voltage detection module 202 detects that a voltage of the electric power storage device 102 has fallen below a predefined level. In a further embodiment, the bypass module 106 bypasses the protection module 104 in response to the output voltage detection module 202 detecting that the voltage has fallen below the predefined level and the power source detection module 110 detecting an absence of electric power from the electric power source 108.

As described with regard to the protection module 104 of FIG. 1, in one embodiment, the voltage drop of the protection module 104 may help keep an output voltage of the electric current delivered to the load 114 within a target range until the output voltage drops below a level that is usable by the load 114. In one embodiment, the predefined level used by the output voltage detection module 202 is equal to or greater than the minimum usable voltage of the load 114 plus the voltage drop of the protection module 104. By selecting a predefined level that is equal to or greater than the minimum usable voltage of the load 114 plus the voltage drop of the protection module 104, in one embodiment, the output voltage detection module 202 detects that the voltage of the electric power storage device 102 has fallen below the predefined level before an output voltage of the system 200 falls below a level that is usable by the load 114. In one embodiment, the bypass module 106 bypasses the voltage drop of the protection module 104 before the output voltage of the system 200 falls below a level that is usable by the load 114 so that the load 114 receives electric current with a useable voltage without interruption.

The output voltage detection module 202, in one embodiment, includes a voltage divider with an output that is electrically coupled to a driving circuit. In a further embodiment, a voltage at the output of the voltage divider determines the predefined level for the output voltage detection module 202. In another embodiment, the power source detection module 110 is integrated with the output voltage detection module 202 and the bypass module 106 does not bypass the protection module 104 while electric power from the electric power source 108 is present, even if the output voltage of the electric power storage device 102 is below the predefined level.

In one embodiment, the output voltage detection module 202 may include one or more switches that open in response to the voltage of the electric power storage device 102 falling below the predefined level and close in response to the voltage rising above the predefined level, such as N type field-effect transistors or the like. The bypass module 106, in one embodiment, may include a switch, such as a P type field-effect transistor or the like, that closes in response to a switch from the output voltage detection module 202 opening and opens in response to the switch closing. In other embodiments, one or more other types of switches, such as PNP and/or NPN bipolar junction transistors ("BJT's"), relays, and/or other switch type devices may be used in place of the example N type and P type field-effect transistors discussed in these example embodiments.

In a further embodiment, the output voltage detection module 202 includes one or more current and/or voltage sensors that detect that the voltage of the electric power storage device 102 has fallen below the predefined level. For example, in various embodiments, the output voltage detection module 202 may include one or more Hall effect current sensors, current transformers, current sense resistors, and/or other current or voltage sensors.

In another embodiment, the output voltage detection module 202 includes one or more diodes or other diode type devices to prevent electric current from the electric power source 108 from flowing through the output voltage detection module 202 to the electric power storage device 102. In a further embodiment, the one or more diodes of the output voltage detection module 202 are electrically coupled in series with the voltage divider of the output voltage detection module 202 and a voltage drop of the one or more diodes, together with characteristics of the voltage divider, determine the predefined level of the output voltage detection module 202. In another embodiment, the one or more diodes of the output voltage detection module 202 are electrically coupled to a diode of the power source detection module 110 in parallel.

In one embodiment, the conservation module 112 delivers electric current that flows through the output voltage detection module 202 to the load 114. In a further embodiment, the electric current that flows through the output voltage detection module 202 is leakage current that would otherwise be wasted, that may decrease the efficiency of the system 200 and the life of the electric power storage device 102. In the depicted embodiment, the conservation module 112 delivers electric current from both the output voltage detection module 202 and the power source detection module 110 to the load 114 at an output of the voltage regulator 206. In one embodiment, an amount of electric current that the conservation module 112 delivers to the load 114 is low enough that the voltage regulator 206 can maintain the output voltage at a substantially constant level.

In a further embodiment, by delivering electric current that flows through the output voltage detection module 202 to an output of the system 200, the conservation module 112 allows the output voltage detection module 202 to use a voltage at the output as a reference voltage instead of using ground or another system voltage. In one embodiment, the output voltage detection module 202 uses the output voltage as a reference voltage and does not include a path to ground. In another embodiment, the output voltage detection module 202 offers little or no alternate routes for electric current but through the conservation module 112.

In one embodiment, the test module 204 temporarily interrupts electric current from the electric power source 108 during a testing procedure. The test module 204, in one embodiment, includes a switch that selectively interrupts electric current from the electric power source 108. In another embodiment, the test module 204 interrupts electric current from the electric power source 108 in response to a battery test signal. The test module 204, in a further embodiment, interrupts electric current from the electric power source 108 periodically for periodic testing procedures.

As part of the testing procedure, in one embodiment, the test module 204 measures a voltage at a point between the protection module 104 and the load 114, such as at an input to the voltage regulator 206 or the like. In another embodiment, the test module 204 alerts a user in response to the voltage being below a predefined minimum threshold level. In one embodiment, a voltage below the predefined minimum threshold level indicates that the electric power storage device 102 should be replaced, for example because the electric power storage device 102 is no longer providing a voltage that is usable by the voltage regulator 206 and/or the load 114. In a further embodiment, a voltage below the predefined minimum threshold level indicates that the electric power storage device 102 may need to be replaced or that the bypass module 106, the power source detection module 110, and/or the output voltage detection module 202 has failed or is not functioning correctly. The test module 204, in various embodiments, may alert a user using a light, a sound, a status register, a code sent to a hardware driver or operating system, a diagnostic message, a text or graphical message, or the like.

In one embodiment, the voltage regulator 206 maintains an output voltage of the system 200 at a substantially constant level. The voltage regulator 206, in one embodiment, includes a linear regulator. In a further embodiment, the voltage regulator 206 includes a switching regulator. The voltage regulator 206, in another embodiment, includes a silicon controller rectifier ("SCR"). In one embodiment, the voltage regulator 206 includes a voltage stabilizer such as a zener diode, an avalanche breakdown diode, a voltage regulator tube, or the like. In a further embodiment, the voltage regulator 206 includes several voltage regulators electrically coupled in a series configuration. In the depicted embodiment, the voltage regulator 206 is electrically coupled between the protection module 104 and the load 114. In a further embodiment, the voltage regulator 206 is electrically coupled between a cathode of the protection module 104 and the load 114.

As described above, in one embodiment, the conservation module 112 delivers electric current flowing through the power source detection module 110 and/or through the output voltage detection module 202 to an output of the voltage regulator 206 to the load 114 instead of to ground, to the power source 108, etc. In one embodiment, more electric current flows into the load 114 than flows through the power source detection module 110 and/or the output voltage detection module 202 so that the voltage regulator 206 passes sufficient electric current to maintain the output voltage at a substantially constant level. In a further embodiment, the voltage regulator 206 has a lower impedance than the power source detection module 110 and/or the output voltage detection module 202.

Figure 3:
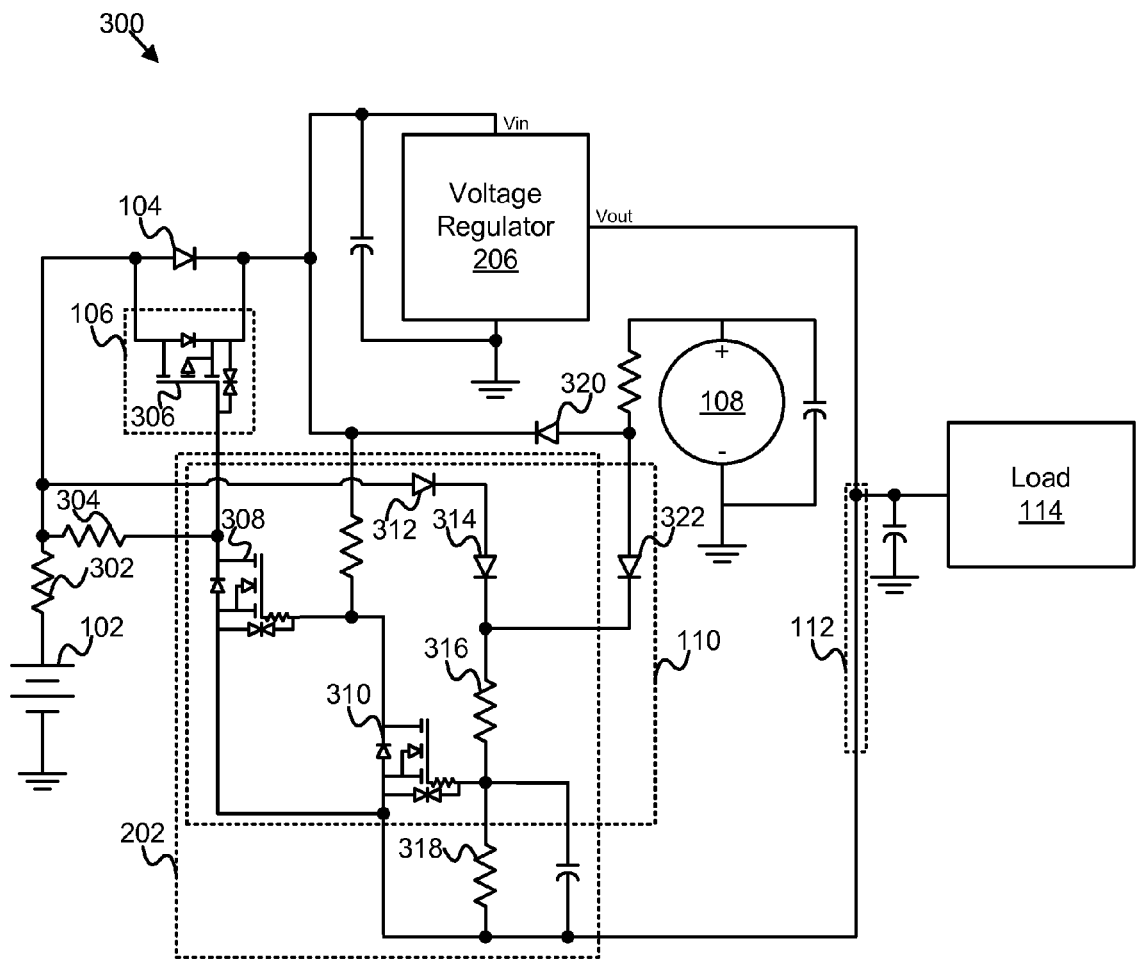
FIG. 3 is a schematic block diagram illustrating a further embodiment of a system to bypass a voltage drop in accordance with the present invention.

FIG. 3 depicts one embodiment of a system 300 to bypass a voltage drop. Like the system 200 of FIG. 2, the system 300, in the depicted embodiment, includes the electric power storage device 102, the protection module 104, the bypass module 106, the electric power source 108, the power source detection module 110, the conservation module 112, the load 114, the output voltage detection module 202, and the voltage regulator 206. In the depicted embodiment, the system 300 further includes a protection resistor 302, a bias resistor 304, a bypass switch 306, a first driving switch 308, a second driving switch 310, a first voltage detection diode 312, a second voltage detection diode 314, a first voltage divider resistor 316, a second voltage divider resistor 318, a power source blocking diode 320, and a source detection diode 322, which are described below.

In the depicted embodiment, the electric power storage device 102 is represented as a battery. The electric power storage device 102, in the depicted embodiment, is electrically coupled in series with the protection resistor 302. In one embodiment, the protection resistor 302 provides a safety backup to protect the electric power storage device 102 should the protection module 104 fail. The protection resistor 302, in one embodiment, has impedance characteristics, fusibility characteristics, and/or other characteristics that protect the electric power storage device 102 from electric current from the electric power source 108 or from another source.

In the depicted embodiment, the protection module 104 is represented as a blocking diode. An anode of the protection module 104, in the depicted embodiment, is electrically coupled to the electric power storage device 102, through the protection resistor 302, and a cathode of the protection module 104 is electrically coupled to the load 114, through the voltage regulator 206. The bypass module 106, in the depicted embodiment, includes the bypass switch 306 that is represented as a P type metal-oxide-semiconductor field-effect transistor ("MOSFET") in parallel with the diode of the protection module 104. In the depicted embodiment, the bias resistor 304 is disposed between the output of the electric power storage device 102 and the gate of the bypass switch 306 to bias the bypass switch 306 as normally open. In the depicted embodiment, the bypass switch 306 of the bypass module 106 is electrically coupled between the anode and the cathode of the protection module 104 in a parallel configuration.

A gate of the bypass switch 306, in the depicted embodiment, is electrically coupled to the first driving switch 308. In the depicted embodiment, a gate of the first driving switch 308 is electrically coupled to the second driving switch 310. The first driving switch 308 and the second driving switch 310, in the depicted embodiment, are represented as N type MOSFET's. As depicted, in one embodiment, the first driving switch 308 and the second driving switch 310 form a driving circuit that is included in the power source detection module 110 and the output voltage detection module 202. An output of the driving circuit formed by the first driving switch 308 and the second driving switch 310, in the depicted embodiment, is electrically coupled to the bypass module 106 at the gate of the bypass switch 306.

In the depicted embodiment, the bypass switch 306 is a P type MOSFET that has a channel that is on/closed with a low gate to source voltage and off/open with a high gate to source voltage. The first and second driving switches 308, 310, in the depicted embodiment, are N type MOSFET's that have channels that are off/open with a low gate to source voltage and on/closed with a high gate to source voltage. In the depicted embodiment, while either electric power from the electric power source 108 is present or the voltage of the electric power storage device 102 is above a predefined level, the channel of the first driving switch 308 is off/open and the channel of the second driving switch 310 is on/closed, causing the channel of the bypass switch 306 to be off/open. If electric power from the electric power source 108 is not present and the voltage of the electric power storage device 102 is below the predefined level, in the depicted embodiment, the first driving switch 308 is on/closed and the second driving switch 310 is off/open, causing the bypass switch 306 to be on/closed, bypassing the protection module 104.

In the depicted embodiment, the predefined level for the voltage of the electric power storage device 102, below which the bypass module 106 bypasses the protection module 104 if the electric power source 108 is not present, is determined by the voltage drops of the first voltage detection diode 312 and the second voltage detection diode 314 and by the impedances of the first voltage divider resistor 316 and the second voltage divider resistor 318. While the depicted embodiment includes the first voltage detection diode 312 and the second voltage detection diode 314, in a further embodiment, the system 300 includes a single voltage detection diode 314 and the impedances of the first voltage divider resistor 316 and the second voltage divider resistor 318 are adjusted accordingly. Using at least one of the first voltage detection diode 312 and the second voltage detection diode 314, in one embodiment, prevents electric current from the electric power source 108 from flowing to the electric power storage device 102.

In one embodiment, the first voltage detection diode 312 and the second voltage detection diode 314 provide a fixed voltage drop from the voltage of the electric power storage device 102 and the selection of impedances for the first voltage divider resistor 316 and the second voltage divider resistor 318 allows fine tuning for setting the predefined level for the voltage of the electric power storage device 102. In one embodiment, the predefined level corresponds to the level that the voltage of the electric power storage device 102 is at when an output of the voltage divider formed by the first voltage divider resistor 316 and the second voltage divider resistor 318 matches a gate turn-on voltage of the second driving switch 310. In one embodiment, the second driving switch 310 has a tight gate turn-on threshold minimum to maximum, to provide for accuracy, consistency, and predictability.

In one embodiment, the power source blocking diode 320 prevents backflow of electric current to the electric power source 108. In a further embodiment, the power source blocking diode 320 is replaced with the test module 204 of FIG. 2, to allow for testing of the electric power storage device 102, the bypass module 106, the power source detection module 110, and/or the output voltage detection module 202. The test module 204, in another embodiment, is disposed at a different location in the system 300, instead of replacing the power source blocking diode 320.

In one embodiment, the source detection diode 322 also prevents backflow of electric current to the electric power source 108. In a further embodiment, the source detection diode 322 has a voltage drop that is selected so that the output voltage of the voltage divider formed by the first voltage divider resistor 316 and the second voltage divider resistor 318 is above the gate turn-on voltage of the second driving switch 310 when electric power from the electric power source 108 is present, causing the channel of the bypass switch 306 to be off/open.

In the depicted embodiment, the conservation module 112 delivers electric current that flows through the power source detection module 110 and the output voltage detection module 202 to the load 114 at an output of the voltage regulator 206. The electric current that flows through the power source detection module 110 and the output voltage detection module 202, in the depicted embodiment, includes electric current that flows through the first and second voltage detection diodes 312, 314 and/or the source detection diode 322 to the first and second voltage divider resistors 316, 318 and further includes leakage current that may flow through the bypass switch 306, the first driving switch 308, and/or the second driving switch 310.

In the depicted embodiment, the power source detection module 110 and the output voltage detection module 202 do not include a path to ground, but instead use the voltage at an output of the system 300 as a reference, because of the connection through the conservation module 112. Using the output voltage as a reference instead of ground, in one embodiment, delivers electric current used by the power source detection module 110 and the output voltage detection module 202 to the load 114 and offers little or no alternate routes for electric current but through the conservation module 112.

In a further embodiment, an amount of power that the power source detection module 110 and the output voltage detection module 202 use relative to the amount of electric current that passes through them is about equal to an amount of power that the voltage regulator 206 uses relative to the amount of electric current that passes through it. In an embodiment where the relative power user of the power source detection module 110 and the output voltage detection module 202 is about equal to the relative power use of the voltage regulator 206, adding the bypass module 106, the power source detection module 110, and the output voltage detection module 202 to the system 300 does not increase the power used or the draw on the electric power storage device 102 over using the voltage regulator 206 alone without the bypass module 106, the power source detection module 110, and the output voltage detection module 202.

Figure 4:
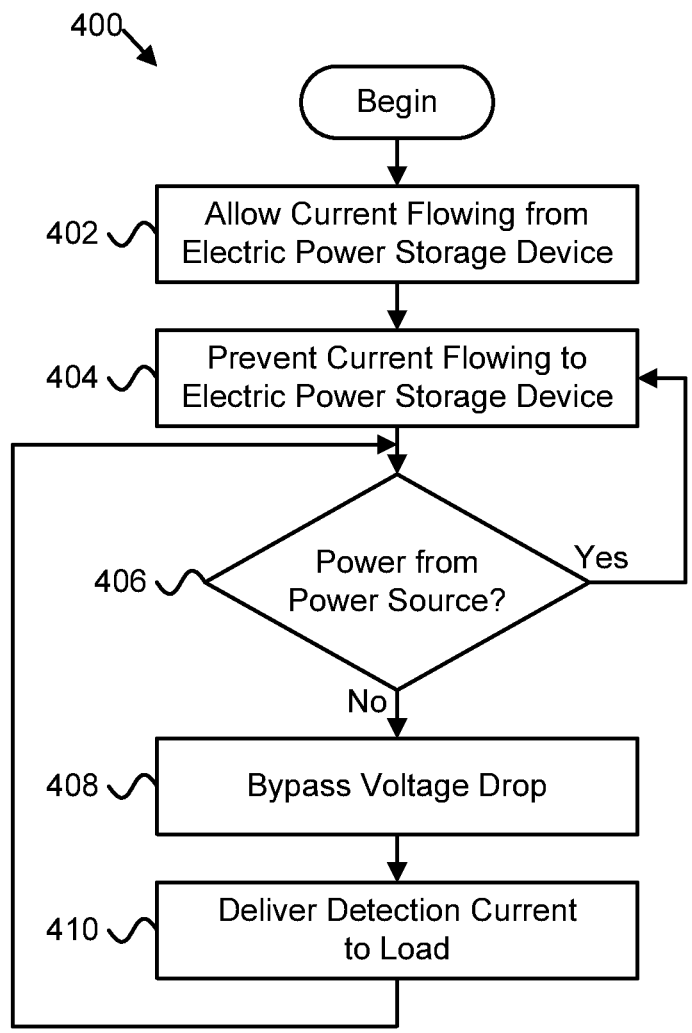
FIG. 4 is a schematic flow chart diagram illustrating one embodiment of a method for bypassing a voltage drop in accordance with the present invention.

FIG. 4 depicts one embodiment of a method 400 for bypassing a voltage drop. In the depicted embodiment, the method 400 begins and the protection module 104 allows 402 electric current to flow from the electric power storage device 102 to the load 114 and prevents 404 electric current from flowing to the electric power storage device 102. The power source detection module 110, in the depicted embodiment, detects 406 electric power from the electric power source 108.

In the depicted embodiment, if the power source detection module 110 detects 406 that electric power from the electric power source 108 is present, the bypass module 106 does not bypass 408 the voltage drop of the protection module 104 and the protection module 104 continues to prevent 404 electric current from flowing to the electric power storage device 102. In the depicted embodiment, if the power source detection module 110 detects 406 an absence of electric power from the electric power source 108, the bypass module 106 bypasses 408 the voltage drop of the protection module 104. The conservation module 112, in the depicted embodiment, delivers 410, to the load 114, electric current that flows through the power source detection module 110. In the depicted embodiment, the power source detection module 110 continues to detect 406 whether electric power from the electric power source 108 is absent or present.

Figure 5:
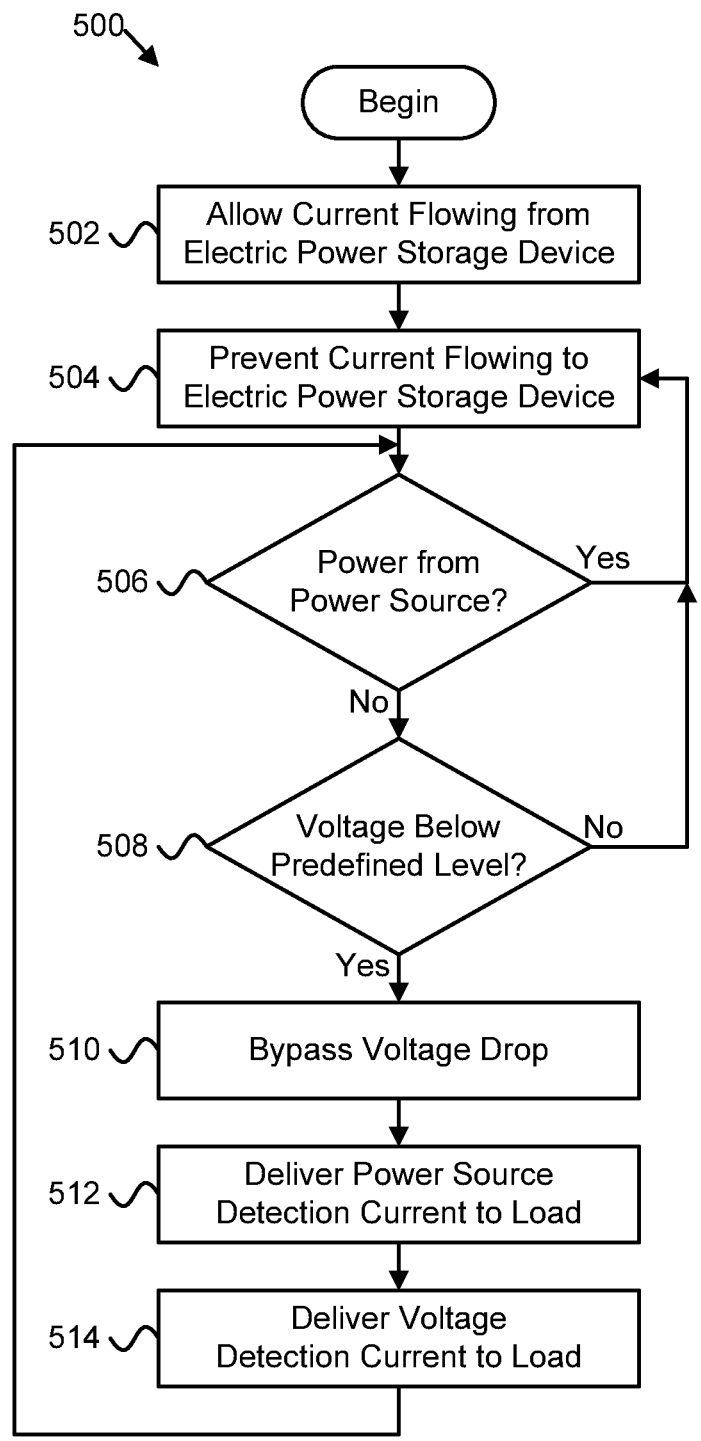
FIG. 5 is a schematic flow chart diagram illustrating another embodiment of a method for bypassing a voltage drop in accordance with the present invention.

FIG. 5 depicts one embodiment of a method 500 for bypassing a voltage drop. In the depicted embodiment, the method 500 begins and the protection module 104 allows 502 electric current to flow from the electric power storage device 102 to the load 114 and prevents 504 electric current from flowing to the electric power storage device 102. The power source detection module 110, in the depicted embodiment, detects 506 electric power from the electric power source 108.

In the depicted embodiment, if the power source detection module 110 detects 506 that electric power from the electric power source 108 is present, the protection module 104 continues to prevent 504 electric current from flowing to the electric power storage device 102. In the depicted embodiment, if the power source detection module 110 detects 506 an absence of electric power from the electric power source 108, the output voltage detection module 202 detects 508 whether the voltage of the electric power storage device 102 has fallen below a predefined level. If the output voltage detection module 202 detects 508 that the voltage of the electric power storage device 102 has not fallen below the predefined level, in the depicted embodiment, the protection module 104 continues to prevent 504 electric current from flowing to the electric power storage device 102.

In the depicted embodiment, if the output voltage detection module 202 detects 508 that the voltage of the electric power storage device 102 has fallen below the predefined level, the bypass module 106 bypasses 510 the voltage drop of the protection module 104. The conservation module 112, in the depicted embodiment, delivers 512, to the load 114, electric current that flows through the power source detection module 110 and delivers 514, to the load 114, electric current that flows through the output voltage detection module 202. In the depicted embodiment, the power source detection module 110 continues to detect 506 whether electric power from the electric power source 108 is absent or present.

Embodiments of the present invention may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes," "has," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus to bypass a voltage drop, the apparatus comprising:
    a protection module configured to allow electric current to flow from a battery to a load and prevent electric current from flowing to the battery, the battery comprising a non-rechargeable battery, the protection module comprising a voltage drop between the battery and the load;
    a power source detection module configured to detect an absence of electric power from an electric power source, the electric power source providing electric current to the load when electric power from the electric power source is present;
    an output voltage detection module configured to detect that a voltage of the battery has fallen below a predefined level;
    a bypass module configured to, in response to the power source detection module detecting the absence of electric power from the electric power source and the output voltage detection module detecting that the voltage of the battery has fallen below the predefined level, bypass the protection module such that the electric current from the battery reaches the load without the voltage drop of the protection module; and
    a conservation module configured to deliver, to the load, electric current flowing through the power source detection module.

2. The apparatus of claim 1, wherein the voltage regulator supplies power to the load, the protection module is electrically connected to the input of the voltage regulator, the power source provides electric current to the load through the voltage regulator and the power source is connected to the input of the voltage regulator.

3. The apparatus of claim 1, wherein the conservation module is configured to deliver, to the load, electric current flowing through the output voltage detection module.

4. The apparatus of claim 1, wherein the output voltage detection module comprises a diode electrically coupled to a voltage divider in a series configuration, an output of the voltage divider electrically coupled to a driving circuit such that a voltage at the output of the voltage divider determines the predefined level for the output voltage detection module, an output of the driving circuit electrically coupled to the bypass module.

5. The apparatus of claim 1, further comprising a voltage regulator disposed between the protection module and the load, wherein the conservation module is configured to deliver the electric current flowing through the power source detection module to an output of the voltage regulator such that the load receives a portion of the electric current from the battery through the voltage regulator and a portion of the electric current from the battery through the power source detection module.

6. The apparatus of claim 1, wherein the power source detection module comprises a diode and a driving circuit, a cathode of the diode electrically coupled to the driving circuit, the cathode of the diode delivering electric current from the electric power source to the driving circuit when electric power from the electric power source is present, an output of the driving circuit electrically coupled to the bypass module.

7. The apparatus of claim 1, wherein the protection module comprises a blocking diode.

8. The apparatus of claim 1, wherein the load is selected from the group consisting of a real-time clock and a volatile memory device.

9. The apparatus of claim 1, further comprising a computing device, wherein the load is a component of the computing device.

10. The apparatus of claim 9, wherein the computing device comprises a blade server.

11. The apparatus of claim 1, further comprising a test module configured to temporarily interrupt electric current from the electric power source and measure a voltage at a point between the protection module and the load.

12. The apparatus of claim 11, wherein the test module is configured to alert a user in response to the voltage being below a predefined minimum threshold level.

13. A method to bypass a voltage drop, the method comprising:
    allowing electric current to flow from a battery to a load and preventing electric current from flowing to the battery, the electric current having a voltage drop between the battery and the load, the battery comprising a non-rechargeable battery;
    detecting an absence of electric power from an electric power source, the electric power source providing electric current to the load when electric power from the electric power source is present;
    detecting that a voltage of the battery has fallen below a predefined level;
    bypassing the voltage drop in response to detecting the absence of electric power from the electric power source and that the voltage of the battery has fallen below the predefined level, such that the electric current from the battery reaches the load without the voltage drop; and
    delivering, to the load, electric current used to detect an absence of electric power from the electric power source.

14. The method of claim 13, further comprising delivering, to the load, electric current used to detect that the voltage of the battery has fallen below the predefined level.

15. An apparatus to bypass a voltage drop, the apparatus comprising:
    a protection module configured to perform a diode function, an anode of the protection module electrically coupled to a battery, a cathode of the protection module electrically coupled to a load such that the protection module allows electric current to flow from the battery to the load and prevents electric current from flowing to the battery, the batter comprising a non-rechargeable battery, the protection module comprising a voltage drop between the battery and the load;
    a power source detection module configured to detect an absence of electric power from an electric power source, the electric power source providing electric current to the load at the cathode of the protection module when electric power from the electric power source is present; and
    an output voltage detection module configured to detect that a voltage of the battery has fallen below a predefined level;
    a switch electrically coupled to the anode of the protection module and the cathode of the protection module such that the switch and the protection module are disposed in a parallel configuration, the switch configured to close in response to the power source detection module detecting the absence of electric power from the electric power source and the output voltage detection module detecting that the voltage of the battery has fallen below the predefined level, such that electric current from the battery reaches the load without the voltage drop of the protection module;
    wherein electric current flowing through the power source detection module is delivered to the load.

16. The apparatus of claim 15, wherein electric current flowing through the output voltage detection module is delivered to the load.

17. The apparatus of claim 15, further comprising a voltage regulator electrically coupled between the cathode of the protection module and the load, wherein electric current flowing through the power source detection module is delivered to an output of the voltage regulator such that the load receives a portion of electric current from the battery through the voltage regulator and a portion of the electric current from the battery through the power source detection module.

* * * * *